Aug. 29, 1950  G. T. BAKER  2,520,451
TRACTOR LOADING ATTACHMENT
Filed March 24, 1948  2 Sheets-Sheet 2
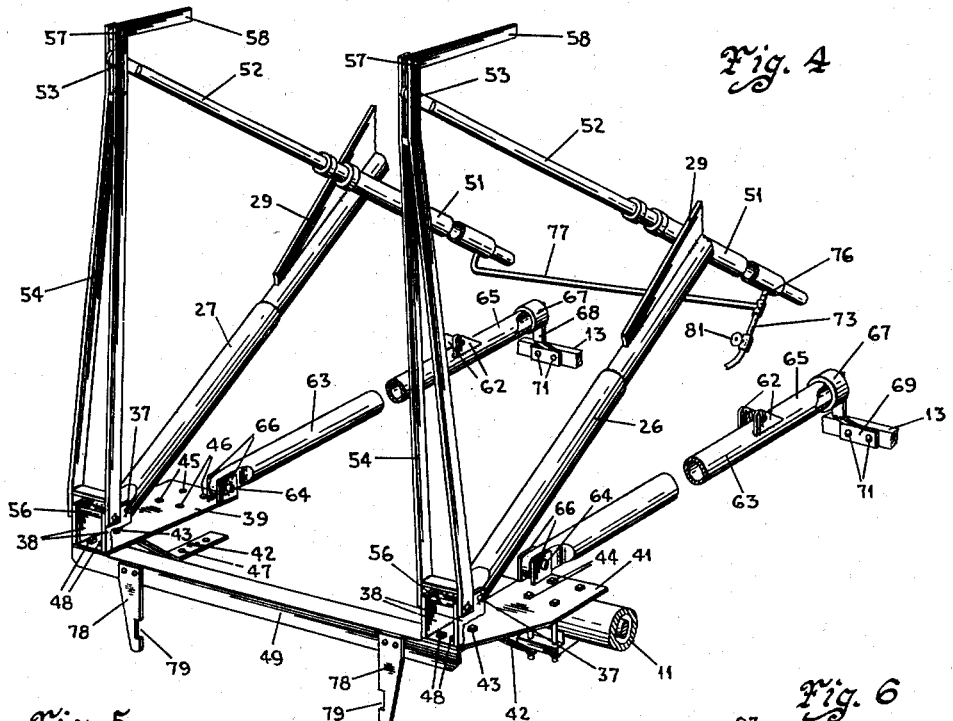
Fig. 4
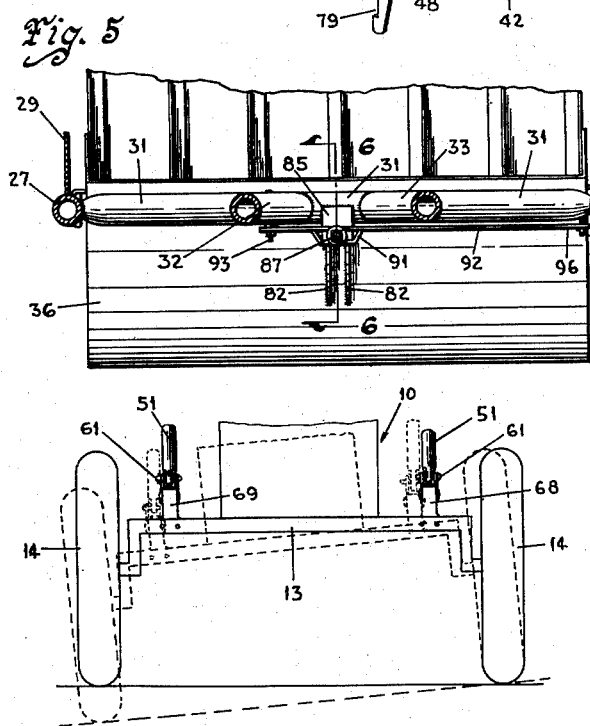
Fig. 5
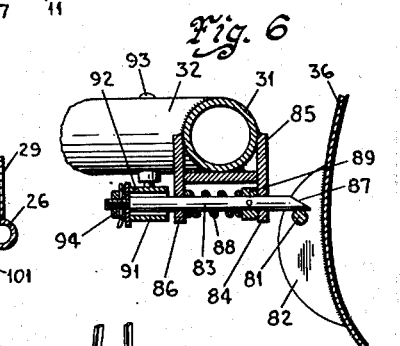
Fig. 6
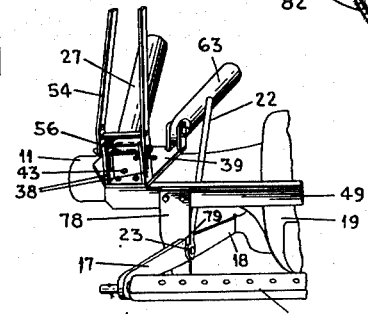
Fig. 7
Fig. 8
INVENTOR.
Gerald T. Baker
BY Rudolph L. Lowell
Attorney Patented Aug. 29, 1950

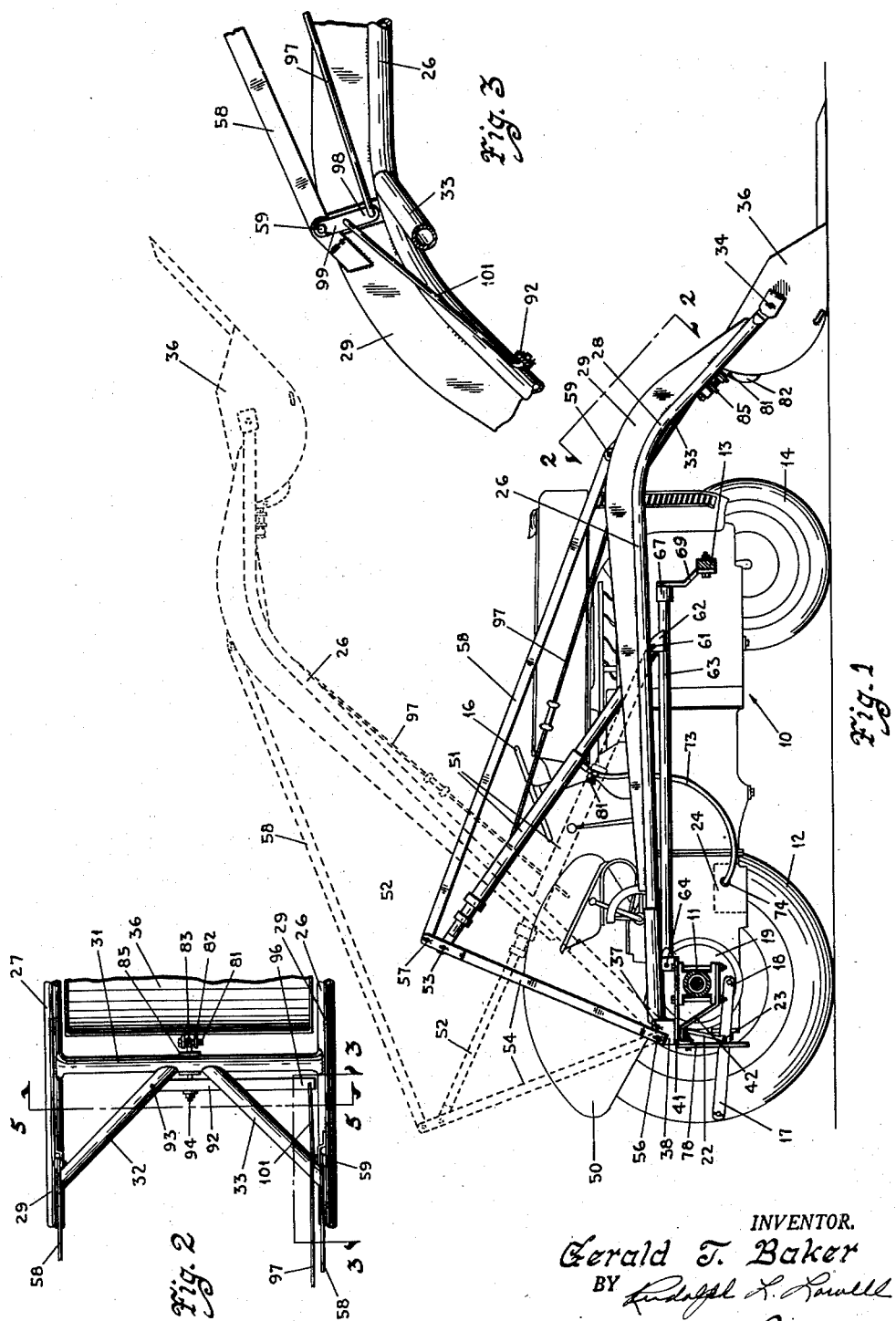

2,520,451

UNITED STATES PATENT OFFICE 2,520,451

TRACTOR LOADING ATTACHMENT

Gerald T. Baker, Neligh, Nebr.

Application March 24, 1948, Serial No. 16,643

5 Claims. (Cl. 214—140)

This invention relates generally to loading machines and in particular to a loading attachment for a farm tractor of a type having spaced apart steerable front wheels, adapted to handle hay, manure, dirt and like material.

An object of this invention is to provide an improved loading machine.

Another object of this invention is to provide a loader attachment for a tractor having a front axle with spaced apart steerable wheels of a construction adapted to distribute the load being handled between the tractor rear end and the front wheels, so that the front axle is substantially free of such load.

Another object of this invention is to provide a loader attachment for a tractor having a front axle with spaced apart steerable front wheels in which a support means for the attachment is movably carried on the tractor with its forward end adjacent to the front wheels such that lift cylinders mounted on the support are maintained in upright positions against relative tipping movement transversely of the tractor at all tilted positions of the front axle.

A further object of this invention is to provide a loader attachment for a tractor having a front axle with spaced apart steerable front wheels in which a pair of pivoted lift arms, arranged at opposite sides of the tractor, are raised and lowered by hydraulic cylinders mounted on support members movably carried on the tractor and front axle such that the lift arms are maintained against relative tipping movement in all moved positions of the lift arms and for all tilted positions of the front axle.

A feature of this invention is found in the provision of a loader attachment for a farm tractor having a front axle equipped with spaced apart steerable wheels, in which a pair of longitudinally extended support members arranged at opposite sides of the tractor are pivoted at their rear ends on the tractor for up and down movement. Brackets carried on the front axle at positions adjacent to the steering wheels are integrally formed with socket members for loosely receiving the front ends of the support members whereby to hold the support members against movement longitudinally of the front axles but permitting a rocking movement of the sockets relative to the support members. Lift cylinders mounted on the support members are thus retained in vertical planes regardless of any relative changes in the elevation to the front wheels.

Further objects, features and advantages of this invention will appear from the following description when taken in connection with the accompanying drawings in which:

Fig. 1 is a side elevational view of the loading attachment of this invention shown in assembly relation with a tractor, with parts broken away and in section to more clearly show such assembly;

Fig. 2 is a fragmentary plan view of the front portion of the attachment as seen along the line 2—2 in Fig. 1;

Fig. 3 is an enlarged fragmentary sectional view taken on the line 3—3 in Fig. 2;

Fig. 4 is a fragmentary foreshortened perspective view of the loader attachment of this invention;

Fig. 5 is an enlarged sectional view as seen on the line 5—5 in Fig. 2;

Fig. 6 is an enlarged sectional detail view taken along the line 6—6 in Fig. 5;

Fig. 7 is a fragmentary rear perspective view of the tractor and loader attachment assembly shown in Fig. 1; and Fig. 8 is a diagrammatic view illustrating changed positions of the lift cylinders relative to changed positions of the tractor front axle.

With reference to the drawings, the loader attachment of this invention is illustrated in Fig. 1 as applied to a Fordson farm tractor having a frame designated generally as 10, a rear axle 11 provided with traction wheels 12 and a front axle 13 equipped with steerable front wheels 14. This general type tractor is commonly referred to as a four wheel tractor because of the fact that the front wheels 14 are spaced apart and arranged at opposite sides of the tractor as contrasted to the usual dual front wheels on a tricycle or row type tractor. The front axle 13 has usual wishbone and tie rod structures (not shown) and the front wheels 14 are mounted for steering movement on upright pivoted spindles (not shown) supported at opposite ends of the front axle 13 and suitably connected with the tie rod and steering wheel 16 in a well known manner.

The Fordson tractor is generally equipped with a hydraulically operated implement power lift, commonly referred to as a Ford-Ferguson power lift, which includes in part (Figs. 1 and 7) a pair of rearwardly extended arms 17 pivoted at their front ends 18 to opposite sides of the differential housing 19 and connected between their rear ends by a transverse draw bar 21. Upright lift rods 22 have their lower ends pivotally connected at 23 with the arms 17 and their upper ends to cranks (not shown) formed as part of a power shaft (not shown). An oil pump unit, indicated at 24 in Fig. 1, is operatively associated with a suitable valve-control mechanism and cylinder arrangement for operating the power shaft to raise and lower the arms 17.

The loader attachment of this invention (Figs.

1 and 4) includes a pair of tubular pivoted lift arms 26 and 27 arranged at opposite sides of the tractor and having their front end portions 28 arranged ahead of the tractor and curved forwardly and downwardly such that the lift arms 26 and 27, in their lowered positions, are in a clearance relation with the tractor front wheels 14. The lift arms 26 and 27 are re-inforced by upright flat brace members 29 welded to their upper sides.

The front end portions 28 of the lift arms 26 and 27 (Figs. 2 and 3) are connected together by a transverse member 31 of a tubular construction. A pair of tubular brace members 32 and 33 are connected between the lift arms 26 and 27 and the transverse connecting member 31. Pivotally supported at 34, between the front ends of the lift arms 26 and 27 and forwardly of the transverse connecting member 31, is a load carrying unit or scoop 36. Thus, as clearly appears in Fig. 1, when the arms 26 and 27 are in their lowered positions, the front end portions 28 are above the top level of the front wheels 14, and the scoop 36 is located forwardly of the tractor.

The rear ends of the lift arms 26 and 27 (Figs. 1 and 4) are pivotally supported for up and down movement on pins or shaft 37 carried between a pair of transversely spaced vertical ears or lugs 38 arranged at the rear ends of brackets 39 and 41 of a flat plate construction. The brackets 39 and 41 are of the same general construction except for being of left and right hand types. The front ends of the bracket plates 39 and 41 are located at opposite sides of the tractor and supported on the top side of the tractor rear axle 11. A pair of brace arms 42, of somewhat irregular shapes, have their front ends positionable against the lower side of the rear axle 11, and their rear ends secured by bolts 43 to the rear ends of the bracket plates 39 and 41. The front ends of the bracket plates 39 and 41 and brace members 42 are clamped about the rear axle 11 by bolts 44 extended through aligned openings 46 and 47 formed in the plates and brace members, respectively. Fender bolts (not shown) are inserted through the bracket plate openings 48 for supporting the tractor rear fenders 50. Connected between the rear ends of the bracket plates 39 and 41, as by bolts 48, is a transverse connecting member 49 of an angle iron construction.

The lift arms 26 and 27 are raised and lowered by means including a pair of rearwardly and upwardly inclined hydraulic cylinders 51 (Figs. 1 and 4), arranged at opposite sides of the tractor and provided with lift pistons 52 which are movable outwardly from the upper ends of the cylinders 51. The free ends of the pistons 52 are pivotally connected at 53 adjacent to the upper ends of guide levers 54. The lower ends of the guide members 54 are pivotally supported on pins 56 carried between the projections 38 on the bracket plates 39 and 41 at positions spaced rearwardly from the lift arm pivots 37.

The upper ends of the guide levers 54 are pivoted at 57 to the rear ends of upwardly and rearwardly inclined lifting levers or rods 58. The forward ends of the lifting levers 58 are pivotally connected at 59 with the upright lift arm braces 29 at positions substantially opposite the brace members 32 and 33. The lifting levers 58 and guide levers 54 are positioned in vertical planes common to the longitudinal axes of the cylinders 51.

The cylinders 51 have their lower ends pivotally supported on pins 61 (Figs. 1 and 4) carried between a pair of upright ears 62 provided on longitudinally extended supports or frame members 63 of a tubular construction. A pair of the supports 63 are arranged at opposite sides of the tractor and are of a length to extend substantially between the rear axle 11 and front axle 13.

The rear ends of the longitudinal supports 63 are pivotally supported for up and down movement on pins 64 mounted between a pair of upright ears 66 provided at the front ends of the bracket plates 39 and 41 at positions spaced forwardly from the ears 38. The front ends 65 of the longitudinal supports 63 are movably carried in rearwardly extended socket members 67 integrally formed as part of front axle brackets 68 and 69. The brackets 68 and 69 are of the same general construction except for being of left and right hand types and are secured as by bolts 71 to the rear side of the front axle 13 at positions adjacent to the front steering wheels 14. As best appears in Fig. 4, the axle brackets 68 and 69 are of a somewhat irregular shape so as to provide for their being in a clearance relation with the wheels 14 and tie rod structure at all moved positions of the front wheels.

It is seen, therefore, that the tubular supports 63 are maintained against rotatable movement within the socket members 67 by the transverse pivots 64 at their rear ends, but that the socket members 67 are rockable or rotatable relative to the front ends 65 of the members 63, for a purpose which will appear later. Further, by virtue of this front end support of the members 63, the supports 63 are held against movement longitudinally of the front axle 13.

On the application of a fluid pressure to the cylinders 51 by actuation of the same valve mechanism used for operating the Ford-Ferguson lift, the pistons 52 are moved rearwardly so that a lifting force is applied adjacent to the front ends of the lift arms 26 and 27 through the lift rods 58 and guide levers 54. The levers 54 act to guide the pivotal movement of the cylinders 51 and to maintain the cylinders in positions extended longitudinally of the tractor. As best appears in Fig. 1, the cylinders 51, when the lift arms 26 and 27 are in their lowered positions illustrated in full lines, are inclined upwardly and rearwardly from their pivot supports 61. At this lowered position of the lift arms, the guide levers 54 are inclined upwardly and forwardly and the lift rods 58 are inclined upwardly and rearwardly.

On raising of the lift arms 26 and 27 to their elevated positions, illustrated in dotted lines in Fig. 1, the cylinders 51, on extension of the pistons 52, are pivotally moved downwardly while the guide levers 54 are moved to upwardly and rearwardly inclined positions and the lift rods 58 to upwardly and forwardly inclined positions. For a more detailed description of the operation of the cylinders 51, levers 54 and rods 58 for raising and lowering the lift arms 26 and 27, reference is made to copending application, Serial No. 700,101, filed on September 28, 1946.

It is to be noted that the downward force applied on the supports 63 through the cylinders 51 is transmitted to the rear axle 11 and front axle 13. However, because of the location of the axle brackets 67 adjacent to the front wheels 14, the greater portion of the load at the front ends 65 of the supports 63 is carried directly by the front wheels, so as to relieve the front axle 13 which is not originally designed for extra load carrying purposes.

By virtue of the relative assembly of the longitudinal supports 63 and the front axle 13, the supports 63, for all transversely tilted positions of the front axle 13, are retained in the same relation to the tractor frame 10. Likewise, for all tilted positions of the front axle 13, the cylinders 51 are maintained in vertical planes and against relative tipping movement transversely of the tractor. Thus, as illustrated in Fig. 8, when the axle 13 is tilted to its dotted line position by the movement of the front wheels 14 over an uneven ground surface, the socket members 67 on the axle brackets 68 and 69, are moved relative to the front ends 65 of the supports 63. As a result of this movement of the socket members 67 relative to the longitudinal supports 63, and the retention of the supports 63 against rotatable movement by the transverse pivots 64, the cylinders 52 remain in parallel vertical planes as shown in dotted lines in Fig. 8. As a result, the lift arms 26 and 27 are maintained level, namely, against relative up and down movement.

It will be appreciated that on tilting movement of the front axle 13, one of the pistons 52 will be retracted, and the other piston 52 extended, depending upon the direction of tilting movement of the front axle 13. However, fluid under pressure is supplied to the cylinders 51 through a common supply line 73 connected to an outlet 74 of the pump unit 24 and has feed lines 76 and 77 independently connected with the cylinders 51. The retraction of one piston 52 and extension of the other piston 52 thus merely results in an equal displacement of fluid between the cylinders 51 through the feed lines 76 and 77. Since the pressure of the fluid in the cylinders 51 and feed lines 76 and 77 is the same at any moved position of the lift arms 26 and 27, dropping of one lift arm relative to the other lift arm, when the front axle 13 is tilted, is completely eliminated.

As previously mentioned, the loader attachment is illustrated in the drawings in an assembly relation with a Fordson tractor equipped with a Ford-Ferguson power lift. In order to control the operation of the lift arms by the same valve control mechanism used for operating the power lift, the arms 17 (Fig. 7) are locked against up and down movement by the provision of a pair of downwardly extended stop members 78 secured at their upper ends at spaced positions on the transverse member 49 connected between the bracket plates 39 and 41. The stop members 78 are formed with notches 79 adapted to receive the arms 17 therein, as shown for one of the stop members in Fig. 7.

When it is desired to operate the power lift, instead of the lift arms 26 and 27, it is only necessary to remove the connecting member 49 and stop members 78. Prior to the removal of the stop members 78, the lift arms 26 and 27 are elevated to a desired position, providing for a ground clearance of the scoop 36. A valve 91 connected in the supply line 73 is then closed so as to maintain the fluid in the cylinders 51 under pressure, and the arms 26 and 27 in an elevated position, in a manner which is believed to be apparent.

The latching mechanism for the scoop 36 (Figs. 5 and 6) includes a transverse catch pin 81 carried between a pair of transversely spaced supports 82 projected rearwardly from the back wall of the scoop. A longitudinally extended latch pin 83 is loosely extended through the lower legs 84 and 86 of an H-shape bracket 85 carried centrally of the transverse connecting member 31 and to the lower side of the member 31. The front end 87 of the latch pin 83 is yieldably moved and held in an engaging position with the catch pin 81 by a coil spring 88 mounted about the latch pin between the legs 84 and 86 and arranged in compression between the leg 86 and a stop collar 89 mounted on the latch pin and engageable with the leg 84 to limit the forward movement of the latch pin.

The rear end of the latch pin 83 is extended through a loop member 91 provided on the underside of a transverse pivoted lever arm 92 arranged rearwardly of the transverse connecting member 31 and having one end pivoted at 93 to the brace member 32. A nut and washer assembly 94, at the rear end of the latch pin 83, is engageable with the rear edge of the loop 91 to provide for a rearward movement of the latch pin 83, when the free end 96 of the pivoted lever 92 is moved rearwardly or to the left, as viewed in Fig. 2. This rearward movement of the lever 92 takes place against the action of the spring 88.

A rearward movement of the lever 92 is accomplished manually by the provision of a trip rod 97 movably supported at its rear end on one of the cylinders 51 and pivotally connected at its front end to the lower or free end 98 of a link 99 which is carried on the pivot 59 of the lift lever 58 corresponding to the lift arm 26 (Fig. 3). A rod 101 is pivoted between the link 99 and the free end 96 of the pivoted lever 92.

Thus on a rearward movement of the trip rod 97 to move the lever 99 in a counter-clockwise direction, as viewed in Fig. 3, the transverse lever 92 is moved rearwardly or to the left, as viewed in Fig. 2, against the action of the spring 88, and the latch pin 83 is moved rearwardly and out of an engaging position with the catch pin 81, whereby the scoop 36 is released for dumping. When the trip rod 97 is released, the latch pin 83 is returned into an engaging position with the catch pin 81.

It is contemplated that the scoop 36 be supported on the pivots 34 such that when a load is dumped therefrom, the rear end of the scoop 36 will be sufficiently heavier than its forward end to accomplish a return of the scoop to its loading position by the action of gravity. As the scoop 36 returns to its loading position, the catch pin 81 (Fig. 6) initially engages the upwardly and rearwardly inclined or tapered surface formed at the front end 87 of the latch pin 83. As a result of this engagement the latch pin 83 is moved rearwardly until the pin 81 is at a position below the lower edge of the latch pin 83. The latch pin 83 is then moved forwardly by the spring 88 and engages the top side of the catch pin 81 so as to hold the scoop 36 in a load-carrying position.

From a consideration of the above description, it is seen that the invention provides a loader attachment for a tractor of four-wheel type which is of a simple and compact construction, efficient in operation, and adapted to be assembled with and removed from the tractor with a minimum of time and effort. The lift arms are of a configuration at their forward ends adapted to clear the front steering wheels of the tractor, and the lift cylinders for the arms are supported by longitudinally extended supports which are movably carried between the tractor front and rear axles such that the lift cylinders are maintained in upright vertical planes at all moved positions of the lift arms, and for all transversely tilted positions of the front axle resulting from a travel of the tractor over an uneven ground surface.

Although the invention has been described with respect to a preferred embodiment thereof, it is to be understood that it is not to be so limited since changes can be made therein which are within the full intended scope of this invention as defined by the appended claims.

I claim:

1. A loading attachment for a tractor having a frame and a front axle equipped with spaced apart steerable wheels comprising a pair of longitudinally extended support members arranged at opposite sides of said frame, means movably supporting said longitudinal members on said frame and on said front axle such that said longitudinal members are maintained against lateral tipping movement and in fixed lateral positions relative to said frame at all transversely tilted positions of said front axle, a pair of lift arms arranged at opposite sides of said frame and pivoted at their rear ends on said frame for up and down movement, a load carrying unit mounted between the front ends of said arms at a position forwardly of the tractor, means for raising and lowering said lift arms including a pair of upright hydraulic cylinders pivoted at their lower ends on said support members for pivotal movement about axes extended transversely of said frame, pistons for said cylinders operatively connected with said lift arms, and tractor operated means for supplying fluid under pressure through a common supply line to said hydraulic cylinders, said pistons being relatively movable within their respective cylinders, in response to a lateral tipping movement of said front axle, whereby to retain said scoop substantially level for any axle tilted positions.

2. A loader attachment for a tractor having a front axle equipped with spaced apart steerable wheels comprising, a pair of longitudinal support members arranged at opposite sides of the tractor, means movably supporting the front ends of said support members on said front axle to provide for a transverse tilting movement of said front axle relative to said support members, means pivotally supporting the rear ends of said members on said tractor for up and down pivotal movement, a pair of pivoted lift arms arranged at opposite sides of the tractor, a load carrying unit supported between the front ends of said arms forwardly of said tractor, means for raising and lowering said lift arms including a pair of upright hydraulic cylinders movably supported at their lower ends on said support members, pistons for said cylinders operatively connected with said lift arms, and tractor operated means for supplying fluid under pressure through a common supply line to said cylinders, said pistons being relatively movable in response to a transverse tilting movement of said front axle whereby to retain said scoop substantially level for any axle tilted positions.

3. A loader attachment for a tractor having a front axle equipped with spaced apart steerable wheels comprising, a pair of longitudinal support members arranged at opposite sides of the tractor, bracket means on said axle adjacent to said wheels having sockets thereon for rockably receiving the front ends of said support members, transverse pivot means supporting the rear ends of said members on said tractor, a pair of pivoted lift arms arranged at opposite sides of said tractor, means for raising and lowering said lift arms including upright hydraulic cylinders mounted on said support members, with said bracket means, on tilting movement of said front axle, being rockable relative to said support members whereby said cylinders are maintained in upright positions against sidewise tipping movement transversely of the tractor, pistons for said cylinders operatively connected with said lift arms, and tractor operated means for supplying fluid under pressure to said cylinders through a common supply line.

4. A loader attachment for a tractor having a front axle equipped with spaced apart steerable wheels comprising a pair of longitudinally extended support members arranged at opposite sides of the tractor, a pair of brackets mounted on said axle having rearwardly extended socket members, with the front ends of said support members being receivable in bearing engagement within said socket members, transverse pivot means for pivotally supporting the rear ends of said longitudinal members on said tractor, a pair of pivoted lift arms arranged at opposite sides of the tractor and to the outside of said longitudinal members, said lift arms being pivoted at their rear ends on said tractor and having a load carrying unit mounted between the front ends thereof, means for raising and lowering said lift arms including hydraulic cylinders pivotally supported at their lower ends on said longitudinal members, pistons for said cylinders operatively connected with said lift arms, and tractor operated means for supplying fluid under pressure to said cylinders through a common supply line.

5. In a loading machine having a portable frame with a front axle equipped with steerable spaced apart front wheels, a pair of pivoted lift arms arranged at opposite sides of said frame and pivoted at their rear ends on said frame, a load carrying unit mounted between the front ends of said arms at a position forwardly of said axle, means for raising and lowering said lift arms including a pair of cylinders arranged at opposite sides of said frame, support means for said cylinders comprising a pair of longitudinally extended support members arranged at opposite sides of said frame and to one side of said lift arms, means pivoting the rear ends of said longitudinal members on said frame for up and down pivotal movement, means supporting the front ends of said longitudinal members on said front axle against movement longitudinally of said axle but permitting a tilting movement of said front axle relative to said longitudinal members, whereby said cylinders are maintained against relative tilting movement transversely of said frame, means pivotally supporting said cylinders on said longitudinal members for up and down pivotal movement in the planes of said longitudinal members, pistons for said cylinders, and tractor operated means for supplying fluid under pressure to said cylinders through a common supply line.

GERALD T. BAKER.

REFERENCES CITED

The following references are of record in the file of this patent:

UNITED STATES PATENTS

| Number | Name | Date |
| --- | --- | --- |
| 2,268,689 | Andrus | Jan. 6, 1942 |
| 2,269,775 | Le Bleu | Jan. 13, 1942 |
| 2,377,495 | Hofmeister | June 5, 1945 |
| 2,387,656 | Gledhill | Oct. 23, 1945 |